United States Patent [19]

Perentin

[11] Patent Number: 4,813,640

[45] Date of Patent: Mar. 21, 1989

[54] SUCTION-CUP WITH A PIN PUT IN, FITTED TO PROP UP SOME POINTS OF SUPPORT FOR CLOTHES ON TRANSPARENT OR NOT TRANSPARENT PANELS, PARTICULARLY SUITABLE TO PREPARE SHOP-WINDOWS, SHOWS, ETC.

[75] Inventor: Alessandro Perentin, Prosecco, Italy

[73] Assignee: Easy Italy s.d.f. di Perentin Alessandro & C., Trieste, Italy

[21] Appl. No.: 113,427

[22] Filed: Oct. 23, 1987

[30] Foreign Application Priority Data

Oct. 24, 1986 [IT] Italy .............................. 59817/86 [U]

[51] Int. Cl.$^4$ .............................................. A47F 5/00
[52] U.S. Cl. ................................ 248/205.8; 248/309.3
[58] Field of Search .............. 248/205.8, 205.5, 205.6, 248/205.7, 205.9, 206.2, 363, 362, 309.3

[56] References Cited

U.S. PATENT DOCUMENTS

| 2,206,159 | 7/1940 | Burgard ........................... 248/205.5 |
| 2,920,187 | 1/1960 | Barilla ........................ 248/205.5 X |
| 3,029,547 | 4/1962 | Ross, Jr. et al. ................. 248/205.8 |
| 4,580,751 | 4/1986 | Pancer ............................... 248/205.8 |
| 4,588,153 | 5/1986 | Boston et al. ................. 248/206.2 X |

FOREIGN PATENT DOCUMENTS 0549130 7/1956 Belgium ........................... 248/205.5

Primary Examiner—Ramon O. Ramirez
Attorney, Agent, or Firm—Browdy & Neimark

[57] ABSTRACT

A pin suction-cup provided with a seat in the body of the suction-cup itself where an ordinary, interchangeable and protruding needle can be fitted. This pin suction-cup has been designed to be easily applied, in the most rapid and rational way, on the surfaces of panels (made of any material, transparent and non-transparent). The protruding needle or pin acts as a grip, a hanger and a point of support for garments or any other item (to be displayed in a shop-window, show, etc., or for interior decorating).

3 Claims, 2 Drawing Sheets

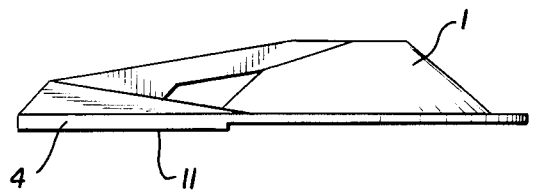
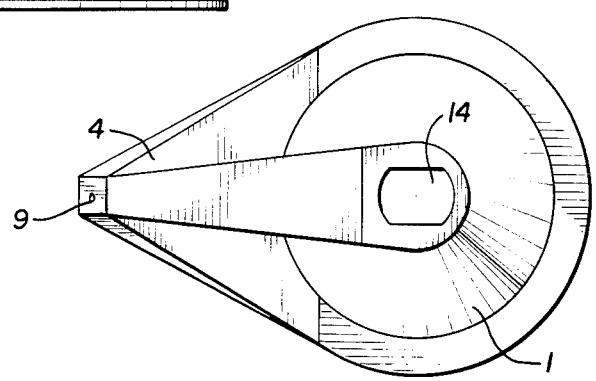
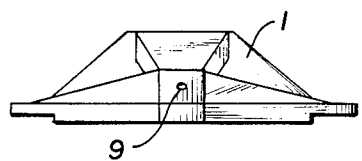
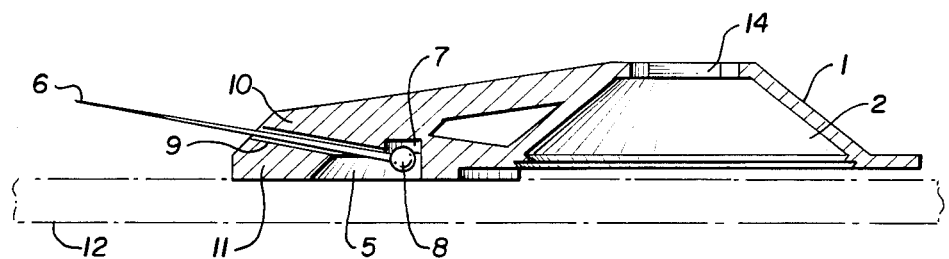
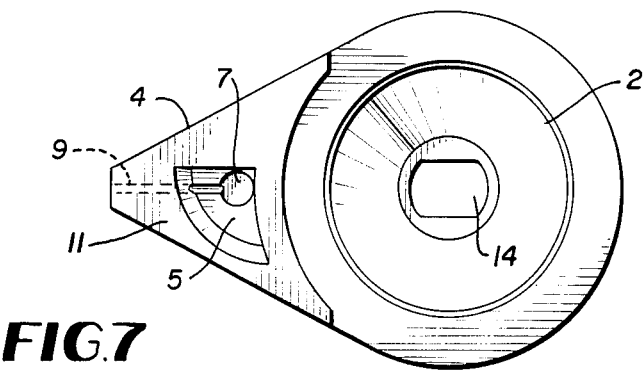

SUCTION-CUP WITH A PIN PUT IN, FITTED TO PROP UP SOME POINTS OF SUPPORT FOR CLOTHES ON TRANSPARENT OR NOT TRANSPARENT PANELS, PARTICULARLY SUITABLE TO PREPARE SHOP-WINDOWS, SHOWS, ETC.

BACKGROUND OF THE INVENTION

1. Field of the Invention

The present invention is related to a suction-cup with an inserted pin to support garments on transparent and non-transparent panels, specially designed for shop-windows, displays, etc.

2. The Prior Art

Emphasis should be laid on the important role played by window-dressing as an element of attraction.

Usually, when preparing shop-windows, displays, tradefair stands and exhibitions in general, particularly in the clothing sector and interior decorating, the need arises to arrange the garments on display, as well as other objects and accessories, in such a way that the buyer can have a feeling of lightness, or to stress and enhance a particular feature of the clothes.

All of this, of course, aims at attracting the attention of the observer and raising the interest of the potential buyer. Neat and careful window-dressing is, therefore, and essential element to make any activity or initiative successful.

Accuracy is all the more important in the clothing sector, where most of the work is based on striking visual effects, constantly changing to adjust to new trends and taste.

When creating such effects, the window-dresser's imagination, creativity and skill are of paramount importance as he has no reliable tools or equipment to achieve the results required and, moreover, no flexible devices which can easily adjust to different arrangements and situations.

Most of the time, the window-dresser has to rely on his own imagination, finding solutions to the different problems, which have to be solved quickly, by using poor materials such as pins, nails, nylon threads, adhesive tapes, etc., and, therefore, result is not always up to expectations, as it is often subdued or, at least, repetitive and very similar to other shop-windows.

SUMMARY OF THE INVENTION

The suction-cup according to the present invention, with its rational and practical design, is a new, original and inexpensive tool for the fitting out of shop-windows, stands, shows and the like, where garments and other objects of limited size and weight are to be displayed. For example: fur coats, overcoats, jackets, shirts, ties, handkerchiefs, scarfs, cardigans, sweaters, caps, hats, belts, etc., or, more in general, lingerie, dressing-gowns, pajamas, materials, fabrics, yarns, wool, carpets, curtains, bathroom and bedroom linen, etc., or any other kind of soft material such as rubber, wood, etc.

It is designed to be used together with panels (of any material and size, transparent and non-transparent, provided they are smooth), according to the effects required, applying the suction-cups onto the surfaces of the panels themselves, in the positions and number preferred.

The suction-cups are provided with pins on which the material or garment to be displayed can be hung and therefore fixed onto the panel.

By carefully selecting the positions of the panels and the suction-cups, it is possible to create the most incredible and imaginative arrangements of clothes in an endless number of combinations.

As the pin suction-cups are very easy to mount and to remove, their arrangement can be changed quickly and the display can vary at least in some details, if not in its general set-up.

The pin suction-cups can be either covered and hidden by the garments or left visible.

The final impression is that the garments displayed seem to be floating, as if weightless; the visual effect is striking and immediately catches the observer's eye because of the original tridimensionality of the arrangement which can be developed on various planes rather than on a single one.

The effect is even more stressed when using tempered plate glass panels; the shine and transparency of this material, matched with a suitable lighting of the shop-window, strongly enhances the visual effect so that unique and almost unprecedented visual effects can be achieved.

Glass panels fully justify the use of pin suction-cups, as other suspension devices such as nails, drawing pins etc., cannot be used; further, the pin suction-cup does not cause any damage to the glass panel, such as scratches, marks and so on, which means that the panel can be used again and again.

Of course, panels made of other materials can also be used, provided their surfaces are smooth enough to guarantee the grip of the suction-cup, e.g., wood, chip wood, plastic materials, stained or non-stained glass, plexiglass, metal (stainless steel, copper, aluminium, etc.) or wall facings (tiles, baked clays, porcelains, gres).

The effects obtained change on every occasion, adjusting to a particular line of products and creating different atmospheres, which can be serious, casual, sober, dramatic, witty, light and evanescent, redundant and ostentatious. More in particular, the pin suction-cup referred to above is essentially made up of an elastic and yielding membrane, mounted in a bell-shaped support which is fitted, in turn, in the body holding the pin.

An ordinary needle (the type with a spherical plastic head or any other type) can be fitted in the special seat inside the body. Its point will jut out of the holder thus providing a support for the garments displayed.

The pin suction-cup is hinged with a cam lever which, when turned, makes the suction-cup adhere to the surface of the panel; on the other hand, when turned in the opposite direction, it causes the immediate release of the suction-cup.

It is therefore obvious that the use of one or more pin suction-cups on a support panel makes possible the arrangement of any item in a totally discrete way.

BRIEF DESCRIPTION OF THE DRAWINGS

The following description and the enclosed drawings will help to understand how the invention works, shown by way of example in the drawings, in which:

FIG. 3 shows a side view of the suction-cup body;

FIG. 4 gives a plan view of FIG. 3;

FIG. 5 shows a front view of FIGS. 3 and 4;

FIG. 6 gives the cross-section of the suction-cup body according to the vertical and longitudinal planes, showing the pin seat and the pin itself; and FIG. 7 shows the suction-cup body from below.

DETAILED DESCRIPTION OF THE PREFERRED EMBODIMENT

Figure 1:
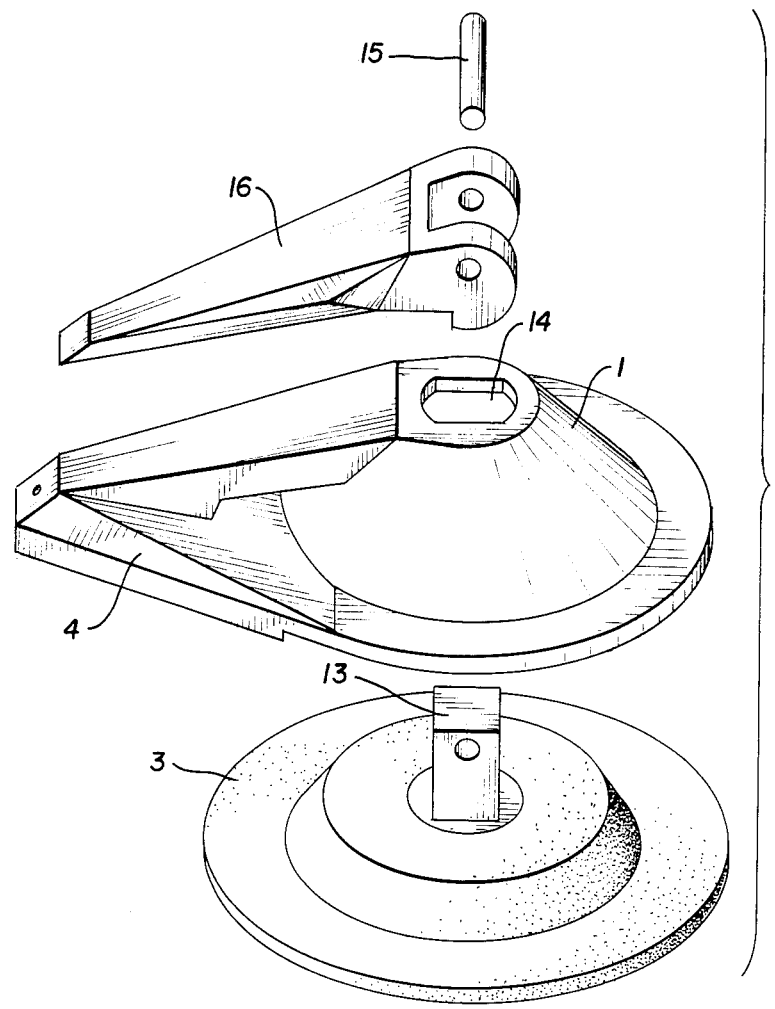
FIG. 1 gives an exploded view of the suction-cup.
Figure 2:
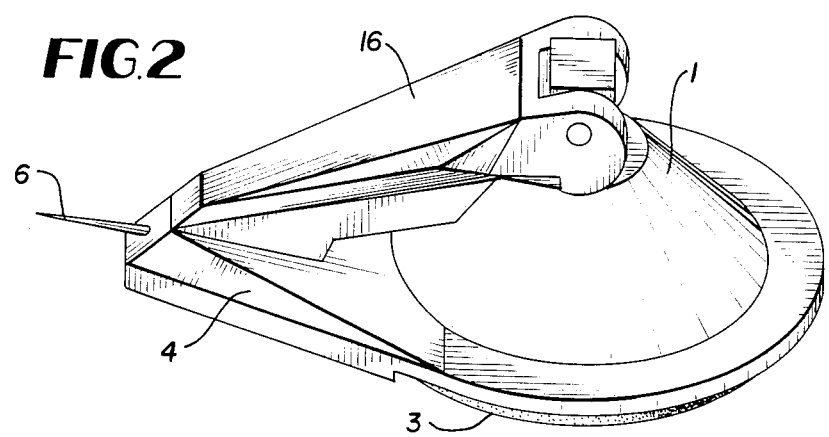
FIG. 2 shows the assembled suction-cup as it looks when mounted onto the panel.

In greater detail, the pin suction-cup in question is made up of a frustom-conical body 1 provided with a seat 2 for membrane 3.

Body 1 includes a protrusion 4 in the lower part of which pin seat 5 can be found, where pin 6 will be fitted; pin seat 5 is provided with a circular seat 7 to house pin head 8 of pin 6 and hole 9 (from which pin 6 itself juts out on end 10).

Hole 9 has a certain degree of inclination as against the lower face 11 of protrusion 4.

This lower face 11, once the suction-cup is mounted onto panel 12, adheres to panel 12 itself; consequently pin 6 with the spherical head 8 is inclined at a certain angle to the surface of panel 12 so that it can catch and hold the items to be displayed.

Membrane 3 is complete with a tang 13 passing through opening 14, placed on the upper part of body 1. By means of pintle 15, cam lever 16 is hinged on this tang 13. By rotating the cam lever, the suction-cup will adhere to or detach from panel surface 12.

Protrusion 4 and cam lever 16 have such dimensions, connectors and facets that, once the suction-cup is fitted, certain ones come into contact with the others forming a compact assembly of limited size, free from projecting parts.

On the basis of the investigations made, the component parts of the suction-cup can be manufactured with any material (plastic, metal, etc.) and in any size, keeping in mind, of course, cost-effectiveness, quality, weight of the finished product, without modifying the model in question.

What is claimed is:

1. A suction-cup supporting items on transparent and non-transparent panels, specially designed for shop-windows, displays and the like, comprising:
    a body;
    a membrane covering an opening in said body;
    a cam lever rotatably mounted on said body so as to enable attaching the suction-cup to a panel and detaching the suction-cup therefrom; and
    a pintle for hinging said cam lever to said body, wherein said body comprises:
    a protrusion under said cam lever and which has a pin seat into which a pin having a pin head is inserted, said protrusion further comprising an opening through which said pin is threaded, at a particular angle to the surface of a panel wherein an end of said pin protrudes out of said protrusion at a particular angle with respect to the surface of the panel for supporting the items to be displayed.

2. The suction-cup according to claim 1, wherein said pin can easily be removed from its seat and replaced and includes a spherical head.

3. The suction-cup according to claim 1, wherein the items to be supported consist of articles of clothing.

* * * * *